(12) United States Patent  (10) Patent No.: US 8,464,848 B2
Wen                      (45) Date of Patent:     Jun. 18, 2013

(54) HEAT DISSIPATION PLATE

(76) Inventor: Yuan-Hung Wen, Hemei Town (TW)

( * ) Notice: Subject to any disclaimer, the term of this patent is extended or adjusted under 35 U.S.C. 154(b) by 281 days.

(21) Appl. No.: 13/017,000

(22) Filed: Jan. 29, 2011

(65) Prior Publication Data
US 2012/0193175 A1 Aug. 2, 2012

(51) Int. Cl.
F16D 65/847 (2006.01)
F16D 55/225 (2006.01)

(52) U.S. Cl.
USPC ............. 188/71.6; 188/73.1; 188/250 B; 188/251 A; 188/251 R; 188/264 CC; 188/264 R

(58) Field of Classification Search
USPC ......... 188/71.6, 264 A, 264 R, 250 B, 250 R, 188/261, 264 G, 24.11–24.12
See application file for complete search history.

(56) References Cited

U.S. PATENT DOCUMENTS

| 3,592,297 | A | * | 7/1971 | Leffert | 188/71.6 |
| 5,332,067 | A | * | 7/1994 | Prud'homme | 188/73.1 |
| 2006/0266600 | A1 | * | 11/2006 | Demers | 188/264 R |
| 2007/0034462 | A1 | * | 2/2007 | Themelin et al. | 188/264 R |
| 2009/0211854 | A1 | * | 8/2009 | Wen | 188/72.2 |

* cited by examiner

Primary Examiner — Robert A Siconolfi
Assistant Examiner — San Aung

(57) ABSTRACT

The present invention provides a heat dissipation plate which includes a heat dissipator and two elastic plates. The heat dissipation plate is adapted to be disposed in a bicycle disc brake. The elastic plates are fixed to the heat dissipator, and the elastic plates are disposed in the bicycle disc brake so as to fix the back panels of the brake linings in the disc brake. Thereby, the elastic plates of the present invention can conduct the heat, which is generated when braking, to the heat dissipator, so that it can prevent the brake linings from overheating when braking. The overheated brake linings may make the disc brake fail to stop the bicycle; therefore, the present invention can enhance the safety of the bicycle disc brake.

13 Claims, 5 Drawing Sheets

HEAT DISSIPATION PLATE

BACKGROUND OF THE INVENTION

1. Field of the Invention

The present invention relates to a heat dissipation device for a brake, and more particularly to a heat dissipation device for a bicycle disc brake.

2. Description of the Prior Art

A conventional bicycle disc brake, as shown in TW 1329086, drives its pistons by a liquid pressure so as to make its brake linings to rub against the brake disc, so that it can reduce the rotation speed of the bicycle wheel. However, the brake linings are often overheated after rubbing with the brake disc, so that the disc brake may fail to function.

Consequently, some back panels of the brake linings are improved so as to dissipate the heat from the brake linings, as shown in TWM343085 and TWM365418. However, the surface area of the back panels is just a little larger than the surface area of the brake linings, so that the improved back panels cannot dissipate the heat efficiently. Moreover, the back panels abut against the pistons, so the heat dissipation effect is limited.

The present invention is, therefore, arisen to obviate or at least mitigate the above mentioned disadvantages.

SUMMARY OF THE INVENTION

The main object is to provide a heat dissipation device which is disposed in a bicycle disc brake so as to dissipate the heat on a brake lining.

To achieve the above and other objects, the present invention provides a heat dissipation plate which is adapted for a bicycle disc brake. The bicycle disc brake includes two back panels, two brake linings and a pin. Each of the back panels has a first surface and a second surface. The brake linings are respectively fixed on the first surfaces. Each of the back panels is formed with an aperture, the pin penetrates through the apertures, and the brake linings are located between the back panels.

The heat dissipation plate of the present invention includes a heat dissipator and two elastic plates. The elastic plates are fixed under the heat dissipator. Each of the elastic plates extends from a bottom of the heat dissipator so as to form with a connection section, an extension section, and two abutting sections. The connection section is fixed to the heat dissipator, and extends vertically. The connection section is formed with a positioning hole. The positioning hole is adapted to be penetrated by the pin. The extension section laterally extends from two sides of a distal end of the connection section. The abutting sections respectively extend vertically from the extension section. The abutting sections are adapted to abut against the first surface of one of the back panels.

The two elastic plates have an elastic tendency to depart from each other, so that the abutting sections abut against the back panels so as to separate the brake linings from each other.

Thereby, the present invention can conduct the heat, which is generated when braking, to the abutting sections. Further, the extension section and the connection section transmit the heat to the heat dissipator, and the heat dissipator then dissipates the heat. As a result, the present invention can prevent the brake linings from overheating and make the disc brake work normally.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2A is a sectional drawing showing A-A in FIG. 2;

FIG. 2B is an enlarged drawing showing a part of the FIG. 2;

DETAILED DESCRIPTION OF THE PREFERRED EMBODIMENTS

Figure 1:
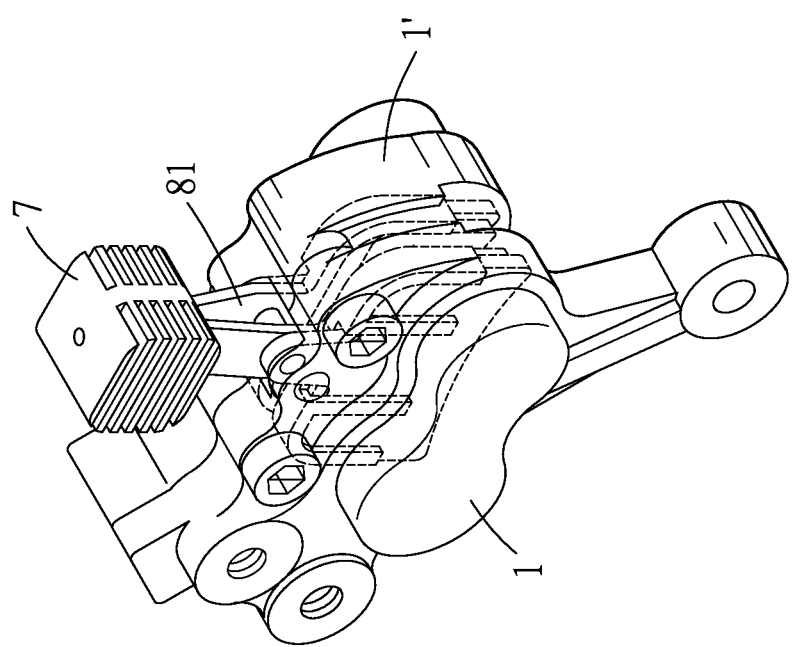
FIG. 1 is a perspective drawing showing a heat dissipation plate of the present invention.
Figure 2:
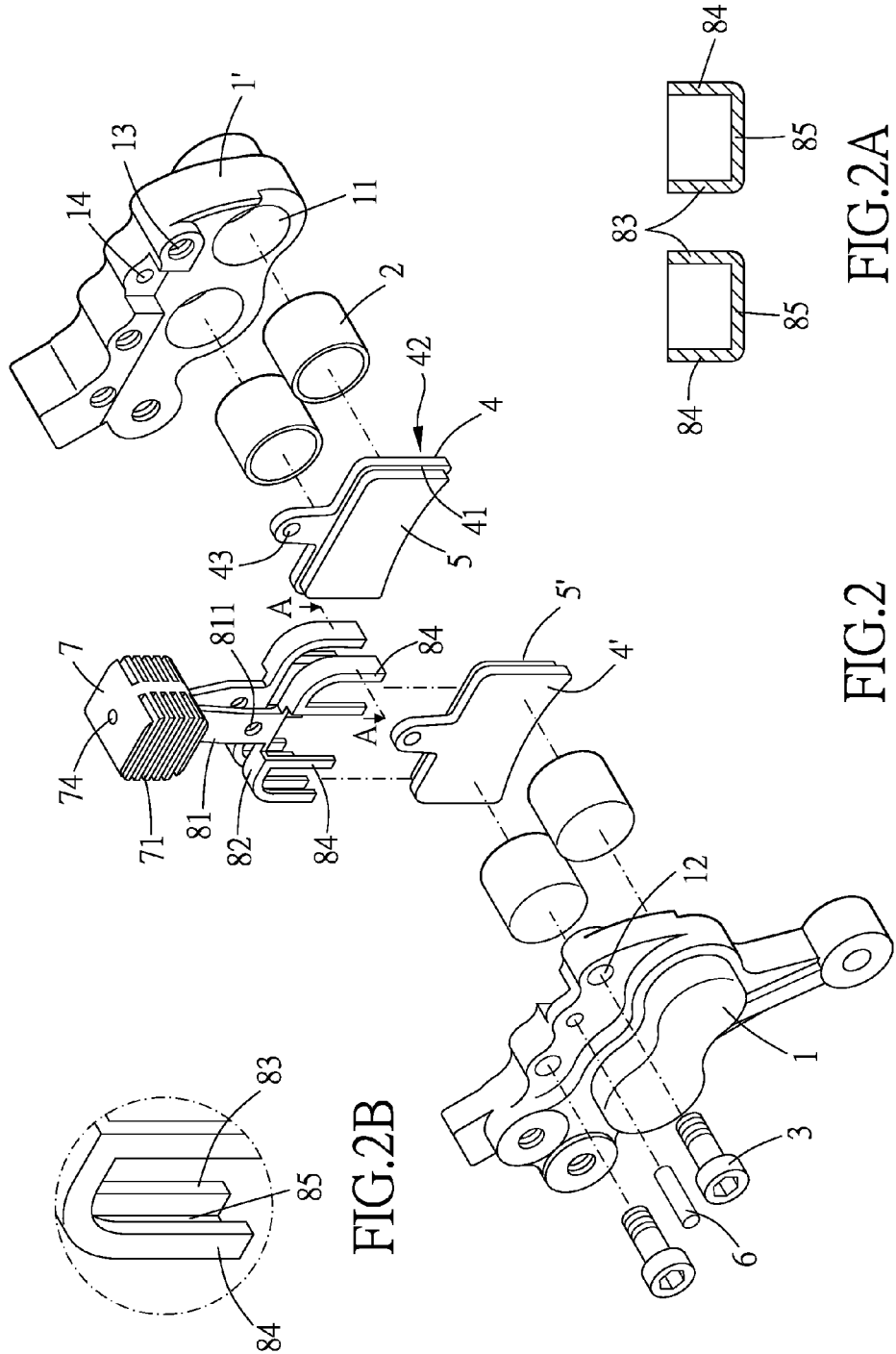
FIG. 2 is a breakdown drawing showing a heat dissipation plate of the present invention.

Please refer to FIG. 1 to FIG. 4. The present invention provides a heat dissipation plate which is used for being disposed in a bicycle disc brake, wherein the bicycle disc brake includes two cases 1, 1', four pistons 2, two fixing members 3, two back panels 4, 4', two brake linings 5, 5' and a pin 6.

The cases 1, 1' are respectively formed with two pressure cylinders 11. Each of the pistons 2 is slidably received in each pressure cylinder 11. Each of the cases 1, 1' is formed with a channel (unshown) which communicates with the pressure cylinders 11, so that the pistons 2 can be controlled by a liquid pressure to approach or depart from each other in pair. One of the cases 1 is formed with two through holes 12, and the other case 1' is formed with two threaded holes 13. The fixing members 3 are respectively penetrate through the through holes 12 and are screwed into the threaded holes 13, so that the cases 1, 1' are fixed to each other. In other possible embodiments of the present invention, the quantity of the pressure cylinders 11 in the cases 1, 1' and the quantity of the pistons 2 in the bicycle disc brake can be changed. Each of the cases 1, 1' is formed with a pin hole 14. Each of the back panels 4, 4' has a first surface 41 and a second surface 42. The brake linings 5, 5' are respectively fixed on the first surfaces 41. Each of the back panels 4, 4' is formed with an aperture 43. The back panels face each other, so that the brake linings 5, 5' are located between the back panels 4, 4'. The back panels 4, 4' are disposed between the pistons 2, so that back panels 4, 4' are pushed to approach each other when the pistons 2 approach each other in pair. The pin 6 penetrates through the apertures 43 and the pin holes 14.

The heat dissipation plate of the present invention includes a heat dissipator 7 and two elastic plates.

Figure 3:
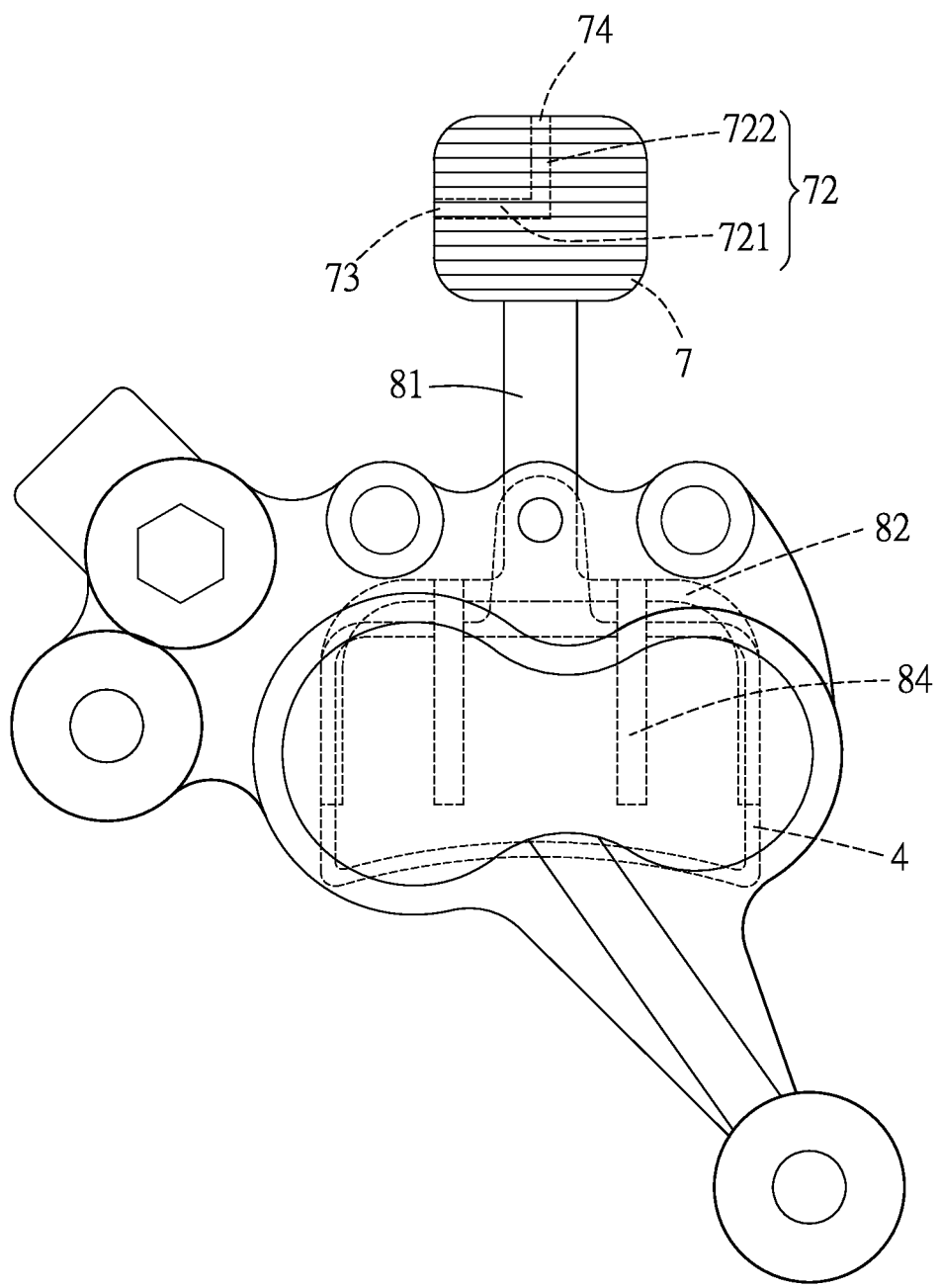
FIG. 3 is a side perspective drawing showing a heat dissipation plate of the present invention.
Figure 4:
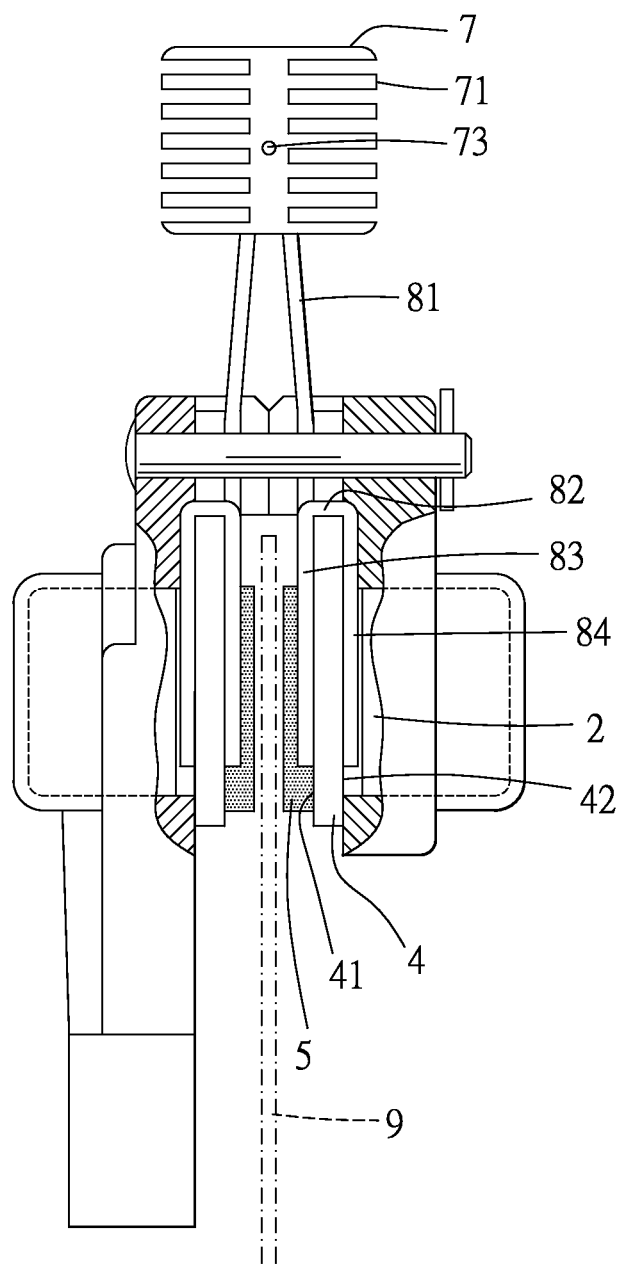
FIG. 4 is a sectional drawing showing a part of a heat dissipation plate of the present invention.

The heat dissipator is used for being fixed with and connected to the elastic plates. Preferably, the heat dissipator 7 is formed with a plurality of grooves, so that the heat dissipator 7 has a plurality of heat dissipation fins 71 side by side. The heat dissipator 7 can be formed with an air hole 72, as shown in FIG. 3. The air hole has a first opening 73 and a second opening 74. The first opening 73 is located on one side of the heat dissipator 7, and the second opening 74 is located on a top of the heat dissipator 7. Preferably, the air hole 72 comprises a horizontal section 721 and a vertical section 722. The horizontal section communicates with the first opening 73, and the vertical section 722 communicates between the horizontal section and the second opening 74. Thereby, air can flow from the first opening 73 to the air hole 72 and then flow out from the second opening 74.

The elastic plates are fixed under the heat dissipator 7. Each of the elastic plates extends from a bottom of the heat dissipator 7 so as to form with a connection section 81, an extension section 82 and two abutting sections 83. Preferably, each elastic plate is further formed with one or more clip portions 84. The connection section 81 is fixed to the heat dissipator 7. Preferably, the connection section 81 and the heat dissipator 7 are formed in one piece and fixed to each other. In other possible embodiments of the present invention, the heat dissipator 7 can be formed with an insertion hole, so that the connection section 81 can be inserted into the insertion hole and then fixed therein. The connection section 81 extends vertically and is formed with a positioning hole 811. The positioning hole 811 is adapted to be penetrated by the pin 6. The extension section 82 extends laterally from two sides of a distal end of the connection section 81. Please refer to FIG. 2A and FIG. 2B. The abutting sections 83 respectively extend vertically from the extension section 82. Preferably, the abutting sections 83 respectively extend from two ends of the extension section 82, and the abutting sections 83 are respectively connected to the two ends of the extension section 82. The clip portion 84 vertically extends from the extension section 82 of the elastic plates. Preferably, each of the elastic plates is formed with a plurality of clip portions 84, and the clip portions 84 are located symmetrically to a vertical central axis of the elastic plates. Thereby, one of the back panels 4 can be clamped between the clip portions 84 and the abutting sections 83 of one of the elastic plates, so that the abutting sections 83 abut against the first surface 41 of one of the back panels, and the clip portions abut against the second surface 42 of the back panel 4. Preferably, each of the elastic plates is formed with two connection portions 85. Each of the connection portions 85 is connected between one of the abutting sections 83 and one of the clip portions 84, so that the sectional shape formed by the abutting sections 83, the connection section 85 and the clip portion 84 is U shaped, as shown in FIG. 2A, and the structural strength of the elastic plates is enhanced.

Besides, the elastic plates have an elastic tendency to depart from each other, so that the abutting sections 83 abut against the back panels 4, 4' so as to make the brake linings 5, 5' separate from each other. More specifically, the material of the connection sections 81 can be elastic, so that the elastic plates have the elastic tendency to depart from each other. In other possible embodiments of the present invention, a spring or other elastic members can be disposed between the elastic plates, so that the elastic member resiliently abuts between the elastic plates.

Figure 5:
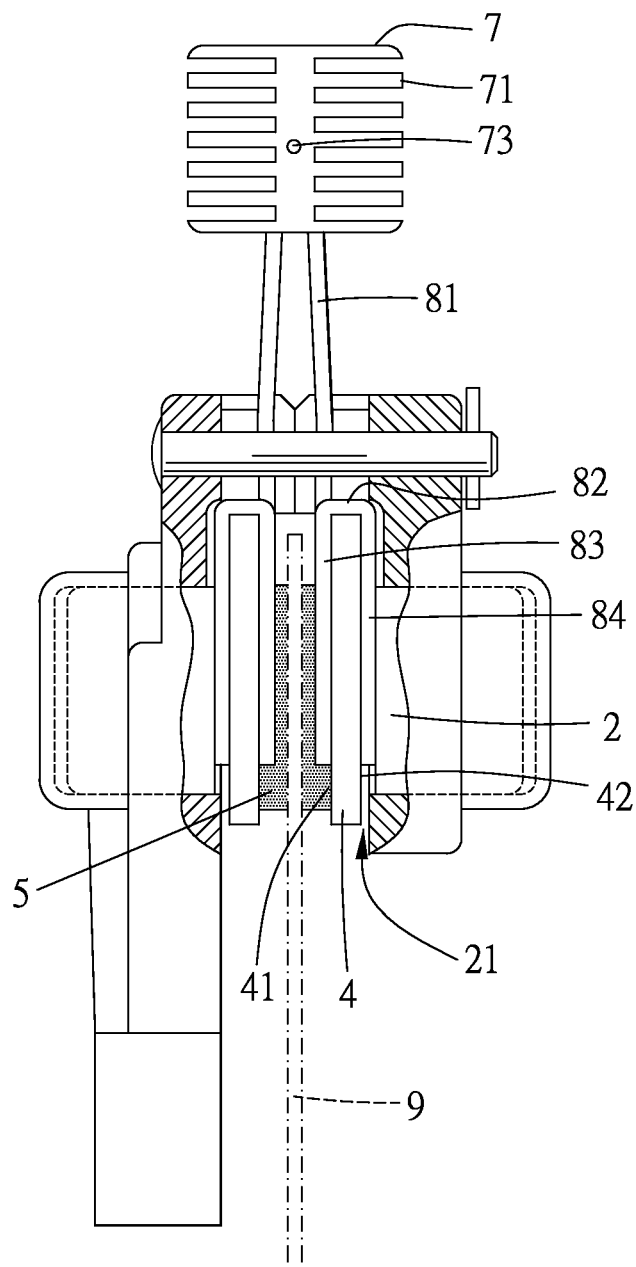
FIG. 5 is a schematic view showing a heat dissipation plate of the present invention, wherein the heat dissipation plate is in use.

Accordingly, when the present invention is disposed in a bicycle disc brake, the abutting sections 83 and the clip portion 84 abut against the back panel 4, so that the present invention can dissipate the heat generated when braking. More specifically, please refer to FIG. 4 and FIG. 5. When a rider brakes a bicycle, the pistons 2 push the back panel 4 and the brake lining 5 so as to make the brake lining 5 rub against the brake disc 9. Therefore, the brake lining 5 is heated, and the back panel 4 which is fixed with the brake lining 5 is also heated. In the same time, the abutting sections 83 and the clip portion 84, which abut against the back panel 4, can conduct the heat to the extension section 82 and the connection section 81, and the heat is then transmitted to the heat dissipator 7. The heat dissipator 7 has a large surface area, so it can efficiently transmit the heat to air, and prevent the back panel 4 and brake lining 5 from overheating. As a result, the brake lining 5 does not overheat and make disc brake malfunction.

Moreover, the clip portion 84 of the elastic plate abuts against the second surface 42 of the back panel 4, so that clip portion 84 is clamped between the back penal 4 and the pistons 2. And a seam is then formed between the pistons 2 and the back penal 4. Air can flow into the seam so as to enhance the dissipation efficiency of the back panel 4.

In addition to the heat dissipation fins 71, the heat dissipator is further formed with an air hole 72. And the first opening 73 can be disposed toward the riding direction, so that air can flow into the air hole directly when riding the bicycle. As a result, the air hole 72 can make the heat dissipator 7 dissipate the heat more efficiently.

According to the above descriptions, the present invention which is adapted to be disposed in a bicycle disc brake can dissipate heat so as to prevent the brake linings from overheating. And the present invention can further make the back panel dissipate heat more effectively.

What is claimed is:

1. A heat dissipation plate, being adapted for a bicycle disc brake, the bicycle disc brake comprising two corresponding cases coupled together, two back panels, two brake linings, and a pin, the back panels, brake linings and pin being assembled between the cases, each of the back panels having a first surface and a second surface, the brake linings being respectively fixed on the first surfaces, each of the back panels being formed with an aperture, the pin penetrating through the apertures, the brake linings being located between the back panels, the heat dissipation plate comprising:
    a heat dissipator,
    two elastic plates, fixed under the heat dissipator, each of the elastic plates extending from a bottom of the heat dissipator so as to form with a connection section, an extension section, and two abutting sections, the connection section being fixed to the heat dissipator, the connection section extending vertically, the connection section being formed with a positioning hole, the positioning hole being adapted to be penetrated by the pin, the extension section laterally extending from two sides of a distal end of the connection section, the abutting sections respectively extending vertically from the extension section, the abutting sections being adapted to abut against the first surface of one of the back panels;
    wherein the elastic plates have an elastic tendency to depart from each other, so that the abutting sections abut against the back panels so as to separate the brake linings from each other;
    wherein the whole of the heat dissipator is located beyond the two cases, the connection sections gradually approach to each other from their respective distal ends toward the heat dissipator, and at least part of the bottom of the heat dissipator is continuously connected between the two elastic plates.

2. The heat dissipation plate of claim 1, wherein each of the elastic plates is formed with at least one clip portion, each of the clip portions vertically extends from the extension sections of the elastic plates, one of the back panels is clamped between the clip portion and the abutting sections of each elastic plate, so that the clip portion abut against the second surface of the back panels.

3. The heat dissipation plate of claim 2, wherein each of the elastic plates is formed with a plurality of clip portions, each of the elastic plates is formed with two connection portions, each of the connection portions is connected between one of the abutting sections and one of the clip portions.

4. The heat dissipation plate of claim 1, wherein the abutting sections of each elastic plate are respectively connected to two ends of the extension section of each elastic plate.

5. The heat dissipation plate of claim 2, wherein the abutting sections of each elastic plate are respectively connected to two ends of the extension section of each elastic plate.

6. The heat dissipation plate of claim 3, wherein the abutting sections of each elastic plate are respectively connected to two ends of the extension section of each elastic plate.

7. The heat dissipation plate of claim 1, wherein the heat dissipator is formed with a plurality of grooves, so that the heat dissipator has a plurality of heat dissipation fins side by side.

8. The heat dissipation plate of claim 7, wherein the heat dissipator is formed with an air hole, the air hole has a first opening and a second opening, the first opening is located on a side of the heat dissipator, and the second opening is located on a top of the heat dissipator.

9. The heat dissipation plate of claim 8, wherein the air hole comprises a horizontal section and a vertical section, the horizontal section communicates with the first opening, and the vertical section communicates between the horizontal section and the second opening.

10. The heat dissipation plate of claim 7, wherein every two of the heat dissipation fins form a passage running laterally through the heat dissipator along a direction which is substantially parallel to a direction in which the extension section extends.

11. The heat dissipation plate of claim 3, wherein each of the connection portions is at least partially connected between vertically-extending portions of the corresponding abutting section and clip portion.

12. The heat dissipation plate of claim 11, wherein the corresponding vertically-extending portion, abutting section and clip portion form a receiving slot for engagement of the corresponding back panel therein.

13. The heat dissipation plate of claim 1, wherein the positioning hole is near the distal end of the connection section.

* * * * *